G. SEIDEL.
MACHINE FOR FINISHING STEREOTYPE PLATES.
APPLICATION FILED DEC. 26, 1911.

1,098,177.

Patented May 26, 1914.

5 SHEETS—SHEET 1.

G. SEIDEL.
MACHINE FOR FINISHING STEREOTYPE PLATES.
APPLICATION FILED DEC. 26, 1911.
1,098,177.
Patented May 26, 1914.
5 SHEETS—SHEET 2.
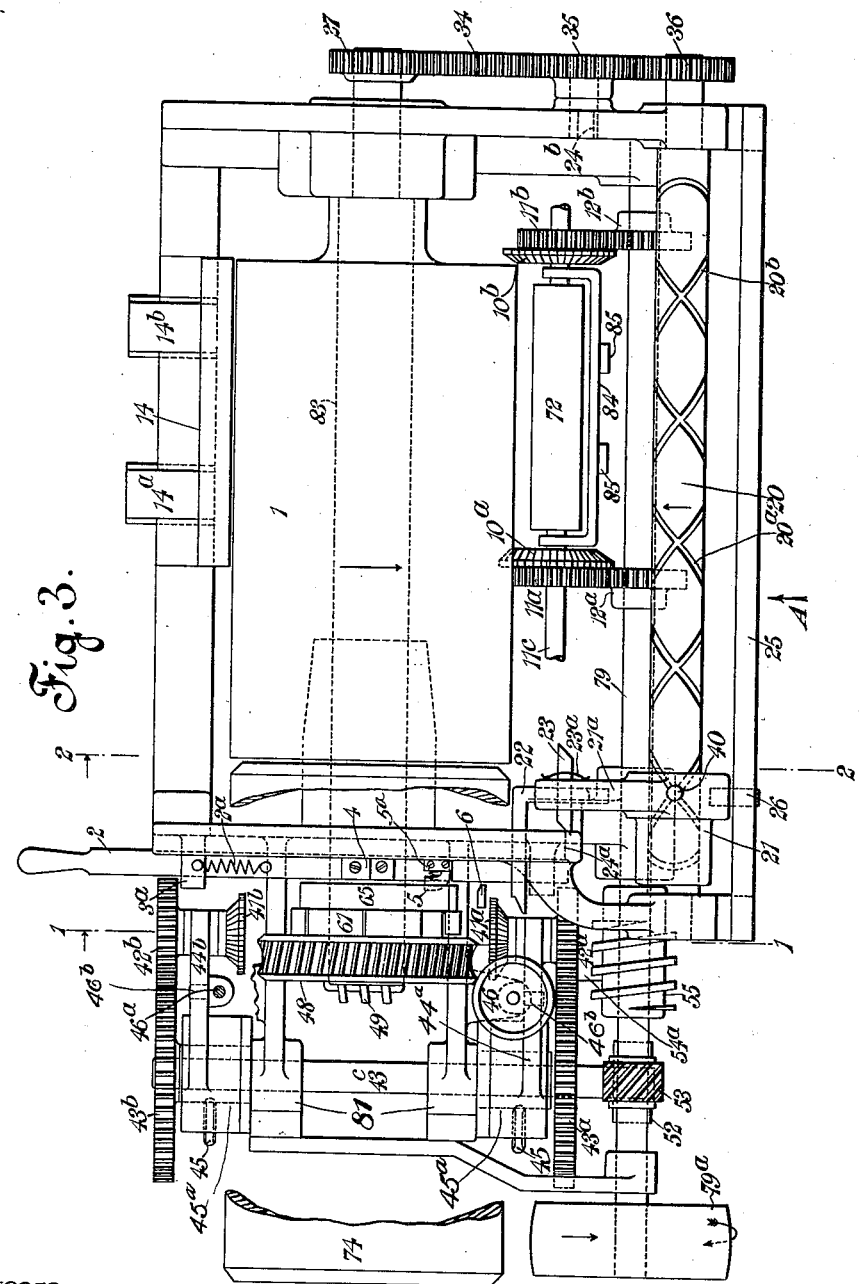

G. SEIDEL.
MACHINE FOR FINISHING STEREOTYPE PLATES.
APPLICATION FILED DEC. 26, 1911.

1,098,177.

Patented May 26, 1914.

5 SHEETS—SHEET 3.

WITNESSES
J. M. Wynkoop
E. R. Heine

INVENTOR
Georg Seidel,
PER
Knight Bros
ATTORNEYS

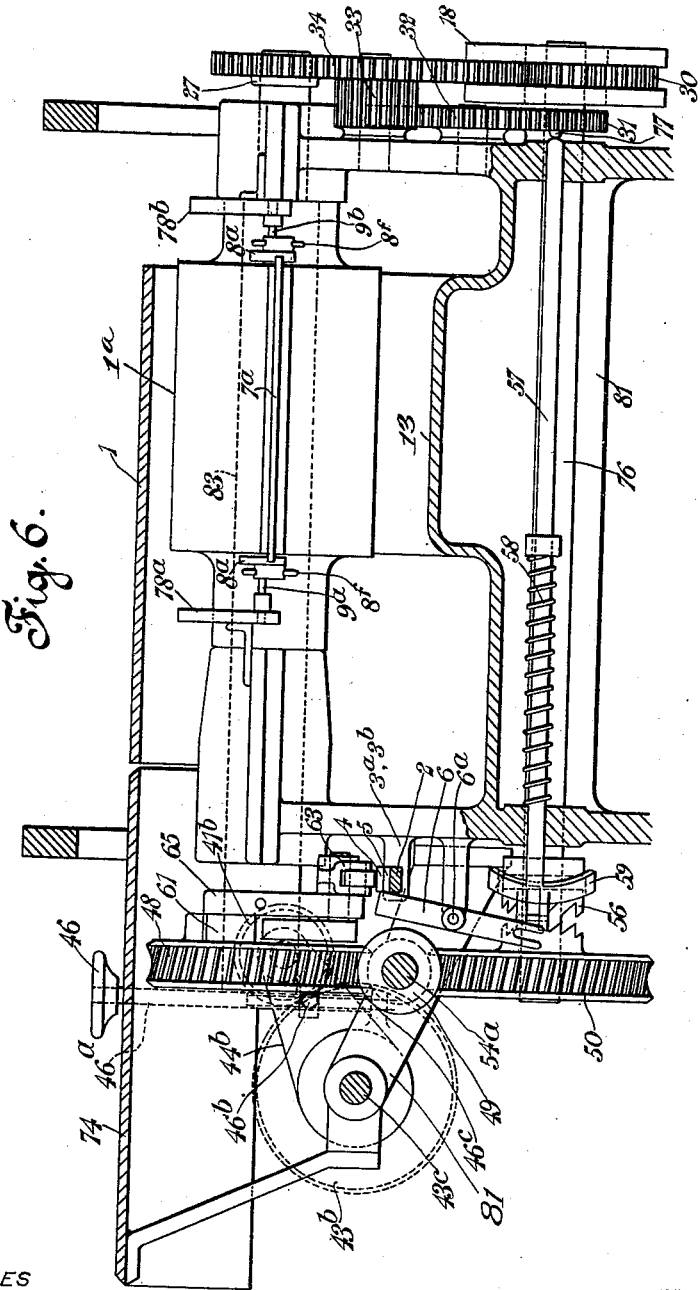

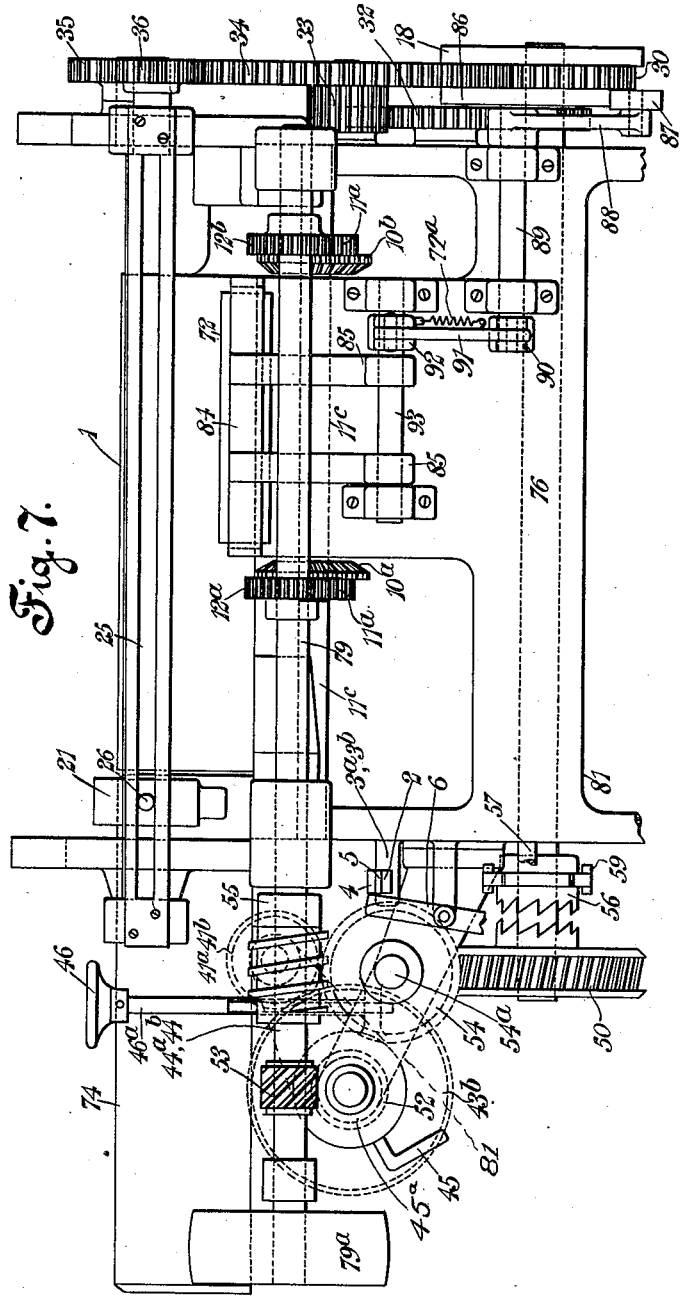

UNITED STATES PATENT OFFICE.

GEORG SEIDEL, OF MUNICH, GERMANY, ASSIGNOR TO CITOPLATE GESELLSCHAFT MIT BESCHRANKTER HAFTUNG, OF BERLIN, GERMANY.

MACHINE FOR FINISHING STEREOTYPE-PLATES.

1,098,177.   Specification of Letters Patent.   Patented May 26, 1914.

Application filed December 26, 1911. Serial No. 667,709.

*To all whom it may concern:*

Be it known that I, GEORG SEIDEL, a citizen of Bavaria, residing at Frauenstrasse 6$^B$, Munich, Germany, have invented certain new and useful Improvements in Machines for Finishing Stereotype-Plates, of which the following is a specification.

Apparatus for machining curved stereotype plates are already known in which a plate laid saddle-wise upon a horizontal cylinder, is carried by the rotation of the latter past rotary cutters which machine both its curved ends, and is then deposited in a concave trough in which it is temporarily held while a knife fast to the said cylinder machines its concave face, after which the devices which were holding the plate in the said concave trough, are withdrawn, and the continued rotation of the cylinder carries the plate out of the trough into its original position, whereupon the apparatus stops. The plate is then moved by a traverser lengthwise over other rotary cutters which machine its straight side edges.

The present invention consists of improved means for (*a*) carrying the stereotype plate into and out of the trough; (*b*) for varying the level to which the straight side edges of the plate are machined; (*c*) for continuing the motion of the traverser after the cylinder has stopped, and for stopping the traverser as soon as the said side edges have been machined.

A preferred constructional form of the invention is illustrated in the accompanying drawings in which—

Figure 1:
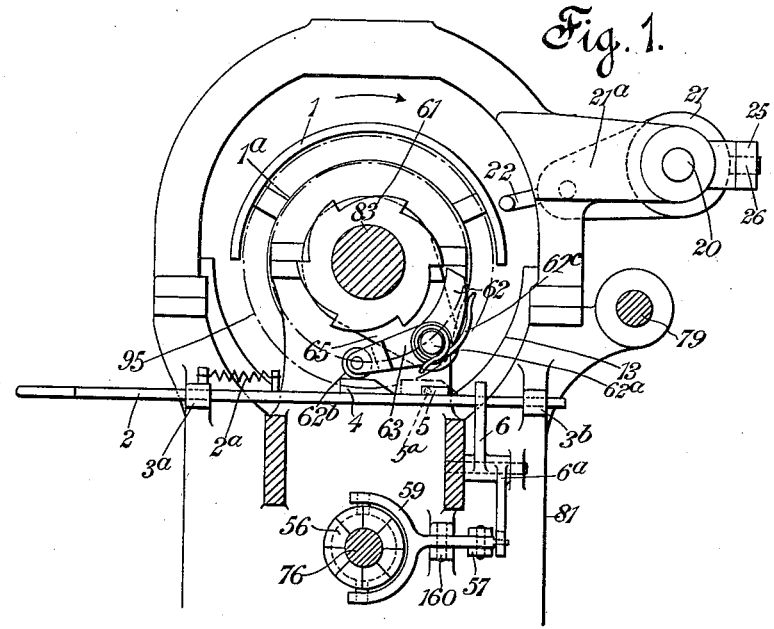
Figure 2:
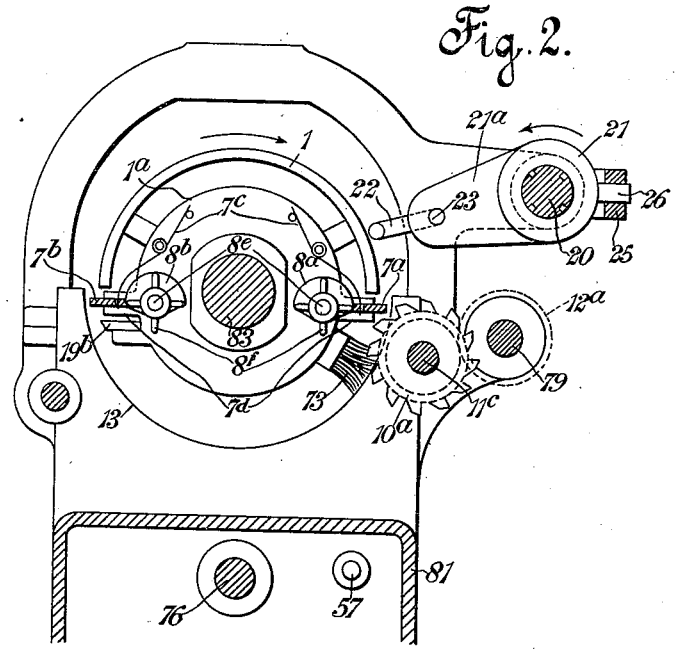
Figure 5:
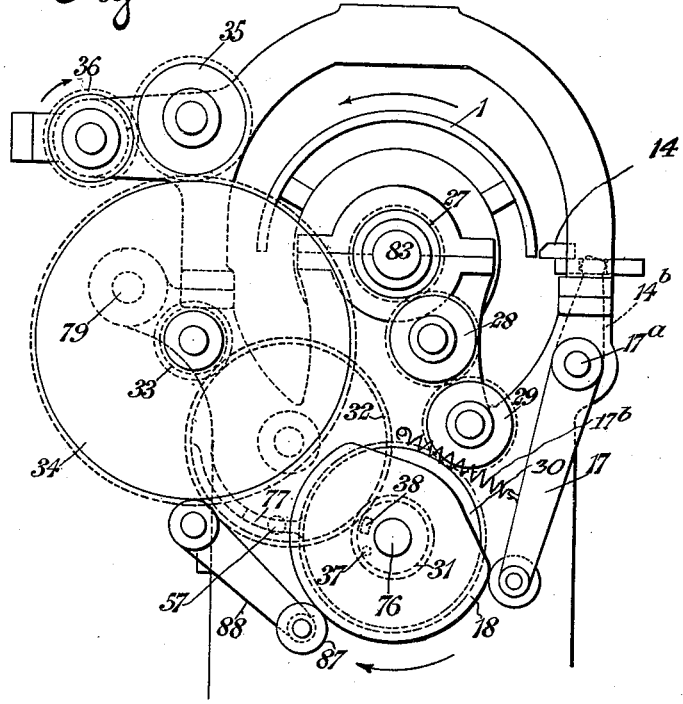
Figure 4:
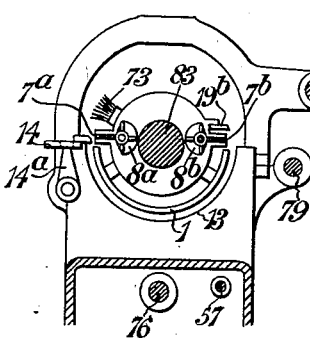
Figure 8:
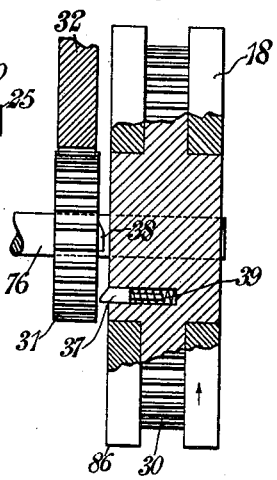

Figures 1 and 2 are transverse sections taken on the lines 1—1 and 2—2, respectively, of Fig. 3, looking at the latter from the left hand; Fig. 3, a plan of the apparatus; Fig. 4, a transverse section on the said line 2—2, after the saddle has turned through a quarter of a cycle; Fig. 5, an end elevation of Fig. 3 looking at it from the right hand; Figs. 6 and 7, respectively, a longitudinal section, and a side elevation looking at Fig. 3 in the direction of the arrow A; and Fig. 8, a sectional detail.

79$^a$ (Figs. 3 and 7) is the driving pulley fast on the end of a longitudinal shaft 79 turning in suitable bearings in the main frame 81 and carrying a worm 55 which gears with a worm wheel 54 fast on a transverse shaft 54$^a$ which carries a worm 49 (Fig. 3) gearing with a worm wheel 48 loose on a second longitudinal shaft 83.

61 is a ratchet wheel fast to the wheel 48. Both the latter turn clockwise looking at Fig. 1 as long as the pulley 79$^a$ is being driven.

1 (Figs. 1 to 6) is a saddle of the same radius as and not shorter than the stereotype plates to be machined. It is fast on a cylinder 1$^a$ which is itself fast on the shaft 83.

13 (Figs. 1, 2 and 6) is the fixed trough under the cylinder 1$^a$ and saddle 1.

The improved means for carrying the stereotype plate into and out of the trough 13, comprises the following parts: 7$^a$, 7$^b$ (Fig. 2) are two ledges, one on each side of the cylinder 1$^a$, and working radially in guides 7$^d$. 8$^a$, 8$^b$ are a pair of cams mounted outside each end of the cylinder 1$^a$ (Figs. 2 and 6) on stud axles 8$^e$, each cam having four equal and radially disposed fingers 8$^f$ fast to it. 78$^a$, 78$^b$ are a pair of stationary plates, one opposite each end of the saddle 1 and holding a stud in the path of the fingers 8$^f$ of each cam. Thus each plate has two studs, only one on each plate, viz:—stud 9$^a$ on plate 78$^a$ and stud 9$^b$ on plate 78$^b$ appearing in Fig. 6, because the other two are respectively behind them. Thus the cams 8$^a$, 8$^b$, fingers 8$^f$, and studs 9$^a$, 9$^b$ constitute automatic means for protruding the ledges 7$^a$, 7$^b$, while springs 7$^c$ carried by the cylinder 1$^a$ and engaging in the respective ledges constitute automatic means for withdrawing the said ledges when the smaller radii of the cams contact with the latter.

10$^a$, 10$^b$ are the rotary cutters for machining the ends of the stereotype plate. They are respectively fast to gear wheels (Fig. 3) 11$^a$, 11$^b$ mounted on a shaft 11$^c$, and which are driven by gear wheels 12$^a$, 12$^b$ respectively mounted on the shaft 79. The wheels 11$^a$, 12$^a$, 11$^b$, 12$^b$, are adjustable lengthwise on the respective shafts 11$^c$, 79, according to the length of the stereotype plate to be machined.

14 (Figs. 3 to 5) is a stop to be alternately rocked over one side of the trough 13 to hold the stereotype plate therein while the knife 19$^b$ is machining its concave face, and back again to allow of the protruded ledge 7$^b$ ejecting the said plate from the trough. This alternate rocking is effected by a lever 17 fulcrumed at 17$^a$ and having its bottom end kept in contact with a regularly rotating cam 18 by a spring 17$^b$ and its top end divided into two arms 14$^a$, 14$^b$, the top ends of which are loosely connected to the stop 14. The cam 18 is rotated by being fast to a gear 30 described farther on.

19$^b$ (Figs. 2, 4) is a knife as long as the saddle 1, fast to the cylinder 1$^a$ and projecting radially from the latter to machine the concave face of a stereotype plate when it is in the trough 13.

73 is a brush fast to the cylinder 1$^a$ and projecting from it far enough to brush the concave face of the plate after it has been machined.

72 (Figs. 3 and 7) is a roller mounted parallel with the saddle 1, in a frame 84 carried by two arms 85. It is alternatively held against the stereotype plate on the saddle 1 while the latter is being rotated, and away from the said plate when the said saddle is at rest, by a spring 72$^a$ and a cam 86 on a longitudinal shaft 76 and which engages a roller 87 on an arm 88 fast on a rock shaft 89 having fast to it a projecting arm 90 connected by a link 91 to an arm 92 fast to and projecting from a rock shaft 93 to which the arms 85 are fast. The cam 86 is rotated by being fast to a gear 30 described farther on. The said spring urges the roller 72 in one direction and the cam 86 urges it in the opposite one.

41$^a$, 41$^b$ (Figs. 3, 6 and 7) are rotary cutters to machine the straight side edges of a stereotype plate. For this purpose, each is held in the path of the respective edge as the traverser (described farther on) pushes the stereotype plate off the saddle 1 on to the stationary receiving saddle 74, by two arms 44$^a$, 44$^b$. The cutters 41$^a$, 41$^b$, are driven by the shaft 79 through a helical gear 53 fast on it engaging a similar gear 52 fast on the shaft 43$^c$ having fast on its respective ends, a gear 43$^a$, 43$^b$, engaging a gear 42$^a$, 42$^b$, respectively fast to the cutters 41$^a$, 41$^b$.

The improved means for varying the level to which the straight side edges of the stereotype plate are machined consist in each of the above-mentioned arms 44$^a$, 44$^b$, being pivotally mounted upon a sleeve 45$^a$ as shown best in Fig. 3. Both these sleeves are axially alined with each other, are concentric with the shaft 43$^c$, and both are revoluble relative to the frame 81. Each arm 44$^a$, 44$^b$ is independent of the other and is arcually adjustable about the sleeve 45$^a$ by a handwheel 46—see Figs. 6 and 7—fast on a vertical spindle 46$^a$—see Figs. 3, 6 and 7— engaging as shown at 46$^b$ in Figs. 3 and 6 with the respective arm 44$^a$, 44$^b$ and having its bottom seated loosely so as to turn but without any axial advance and rock in a part of the frame 81 as indicated in Fig. 7.

Each arm 44$^a$, 44$^b$ is held in its adjusted position by a set screw 45 working through the boss of the respective arm and bearing against the respective sleeve 45$^a$.

22 (Figs. 1 to 3 and 7) is the traverser for moving a stereotype plate off the saddle 1 after its curved ends and concave face have been machined, over the cutters 41$^a$, 41$^b$, and on to the receiving saddle 74. This traverser has two motions, one of them parallel with the axis of the saddle 1 and the other at right angles with it. The means by which these two motions are communicated to it are shown best in Fig. 3.

20 is a longitudinal screw parallel with the axis just mentioned and turning in bearings in the frame but only in the direction indicated by the arrow.

21 is a sleeve embracing the said screw without engaging either of its screw threads (described farther on), so as to slide along it.

21$^a$ is a horizontal arm fast to the sleeve 21 and projecting from it toward the saddle 1. It is bored to receive one member of the traverser 22 which member stands at an angle with it as shown in Fig. 3. The bore is long enough to permit of the above-mentioned motion of the said traverser at right angles with the axis of the said saddle. The sides of the bore are slotted to allow of the reciprocation of the bar 23 described farther on. The screw has a left hand thread 20$^a$ and a right hand one 20$^b$, the ends of the two threads joining each other at each end of the screw (Fig. 3).

40 is a pin fast to the sleeve 21 and engaging in one of the threads at a time and 26 is a stud projecting from the said boss into a fixed horizontal guide slot 25 (Fig. 7) to keep the motion of the traverser horizontal.

23 is a short bar fast to the traverser 22 and partaking its motion in the arm 21$^a$. Both its ends are beveled in the same direction.

The rotation of the screw 20 (the means by which the screw 20 is rotated, are described farther on) ceases at the moment a stereotype plate has passed the cutters 41$^a$, 41$^b$. Just before it ceases, it makes the left end of the bar 23 engage with the fixed surface 24$^a$ to withdraw the traverser 22 out of engagement with the stereotype plate. Fig. 3 shows the commencement of this withdrawal. 24$^b$ is a corresponding surface at the other end of the traverse, to engage the traverser 22 with the respective end of the stereotype plate then on the saddle 1.

23$^a$ is a spring fast to the bar 23 and rubbing on the arm 21$^a$ to hold the traverser 22 in each of its terminal positions with respect to the said arm. Thus the thread 20$^a$ makes the traverser 22 move a stereotype plate off the saddle 1 past the cutters 41$^a$, 41$^b$, and on to the saddle 74, and the thread 20$^b$ returns it to its original position.

The saddle 1 is turned through one of its cycles (two revolutions) and stopped, the screw 20 rotated, its motion continued after the saddle has stopped, and the traverser stopped as soon as the straight side edges of a stereotype plate have been machined, by the following means: 2 (Figs. 1 and 3) is a starting bar sliding transversely in sockets 3$^a$, 3$^b$, on the frame 81. 65 is a radial arm fast to the shaft 83 and 62 is a pawl pivoted thereon at 62$^a$ and kept in engagement with the ratchet 61 by a spring 62$^c$ excepting when a cam 4 fast on the bar 2 rocks up the roller 62$^b$ on the opposite end of the pawl. 5 is a catch controlled by a spring 5$^a$ and so positioned on the bar 2 as to automatically engage with a lever 6 fulcrumed at 6$^a$ on the frame 81, when the bar 2 is pushed inward far enough to carry the cam 4 past the roller 62$^b$. 2$^a$ is a spring pulling on the bar 2 to return it to its original position. 27 is a gear fast on the end of the shaft 83 and driving the screw 20 through gears (Figs. 3 and 5 to 7) 28, 29, 30, 31, 32, 33, 34, 35 and 36, the last fast upon the said screw. The gear 30 is loose and the gear 31 fast on the shaft 76. 30 drives 31 (Fig. 8) by the engagement of the flat side of a pin 37 normally protruded by a spring 39 and carried by the former, with the flat side of a pin 38 fast on the latter. This gearing provides for the rotation of the saddle 1 and of the screw 20 also, both from the pulley 79$^a$ through the ratchet 61 and pawl 62. But the saddle 1 must stop at the end of each cycle to allow of the stereotype plate being pushed off it over the cutters 41$^a$, 41$^b$ and on to the receiving saddle 74 by the traverser 22, and the screw 20 must, at the time the said saddle stops, be connected to the pulley 79$^a$. To so stop the saddle 1, the lever 6 (Figs. 1 and 6) has its bottom end loosely connected with the end of a clutch lever 59 fulcrumed on the frame 81 at 160, while the lever 59 is pivotally connected with the end of a longitudinal rod 57 the opposite end of which is kept by a spring 58 in contact with the side of the gear 32 in the path of a cam 77 projecting therefrom, the said cam being so proportioned that it engages the rod 57 as the saddle 1 is completing a cycle, thereby pushing the said rod inward and disengaging the lever 6 from the catch 5, whereupon the spring 2$^a$ pulls the bar 2 and cam 4 which latter is then in the dotted line position, (Fig. 1) into its original position, and the roller 62$^b$ which is then following the path indicated by the dotted circles 95 in Fig. 1, rides up the said cam, thereby disengaging the pawl 62 from the ratchet 61 and stopping the saddle. To connect the screw 20 to the pulley 79$^a$ at the same time as the saddle is stopped, the shaft 76 has loose on it (Figs. 6 and 7) a worm wheel 50 constantly driven by the worm 49 already described, and carrying one member of a clutch on it. The sliding member 56 of this clutch is on the shaft 76 and is connected to the lever 59 already mentioned, so that the clutch is closed by the cam 77 at the same time as the pawl 62 is disengaged from the ratchet 61, whereby the motion of the screw 20 is satisfactorily continued. This continued motion of the screw 20 is rather faster than that imparted to the latter by the gearing 27 to 36, and as it now turns the gear 36 instead of being turned by it, the pin 38 would overtake the pin 37 and drive the gears 30 to 27, if it were not that the now contacting faces of both the said pins are beveled and that the pin 37 is only spring protruded, the consequence being that the pin 38 pushes the pin 37 out of its way thereby failing to turn the wheel 30. The cam 77 keeps in contact with the rod 57 until the traverser 22 has completed its motion, i. e., has finished pushing the machined stereotype on to the saddle 74, whereupon the said cam leaves the rod 57 whereupon the spring 58 opens the clutch 56 thereby stopping the traverser.

The invention acts as follows: The apparatus (excepting the parts which are constantly driven by the pulley 79$^a$) being at rest; the pawl 62 therefore not engaged with the ratchet 61; the saddle 1 standing above the shaft 83; the ledges 7$^a$, 7$^b$, protruded; the stop 14 held by its spring away from the trough 13; the traverser 22 next to the saddle 74; the cam 77 in engagement with the rod 57 and the clutch 56 open; the attendant places a stereotype plate on the saddle 1 and ledges 7$^a$ and 7$^b$, and pushes in the starting bar 2, thereby (Fig. 1) moving the cam 4 away from the roller 62$^b$, whereupon the pawl 62 connects the shaft 83 and gearing 27 to 36 with the pulley 79$^a$ and the saddle 1 begins its cycle of two revolutions in the direction of the arrow. During the first quarter of the cycle, the circular ends of the stereotype plate are machined by the cutters 10$^a$, 10$^b$, the plate itself is deposited in the trough 13 and lastly, the ledges 7$^a$, 7$^b$ are withdrawn by the cams 8$^a$, 8$^b$, being turned through 90°, and the stop 14 is pushed over the trough. During the second quarter cycle, the knife 19$^b$ shaves the concave face of the plate. During the third quarter cycle, the said face is swept by the brush 73, the stop 14 is withdrawn, and the ledges 7$^a$, 7$^b$ are again protruded. During the fourth quarter cycle, the plate is moved into its original position. Meanwhile, the traverser 22 is moved by the screw 20 to the right of Fig. 3 and protruded by the surface 24$^b$. The cam 77 leaves the rod 57 at the end of the cycle, whereupon the saddle with the partially machined stereotype plate on it, stops, and the motion of the screw 20 is continued by the simultaneous closure of the clutch 56, whereby the traverser 22 is made to push the plate before it over and past the cutters 41ª, 41ᵇ, on to the saddle 74, thereby completing the machining, whereupon the traverser 22 is withdrawn by the surface 24ª, the cam 77 again engages the rod 57 thereby opening the clutch 56 and so leaving the apparatus ready to receive and machine another stereotype plate.

A stereotype is held to its saddle partly by its own weight and partly by the contact of its printing face with the concave face of the trough, up to the moment when it is deposited in the trough 13 and while it is being milled on its ends.

Having described my invention, I declare that what I claim and desire to secure by Letters Patent is:—

1. The combination in an apparatus of the described type, of a rotatable horizontal saddle; a fixed horizontal trough; a movable ledge on each side of the said saddle; means for protruding the said ledges far enough beyond the saddle to serve as supports for a stereotype plate; means for withdrawing them after the said plate has been deposited in the said trough; and means for re-protruding them while the said plate is in the trough.

2. The combination in an apparatus of the described type, of a rotatable horizontal saddle; a fixed horizontal trough; a movable ledge on each side of the said saddle; automatic means for protruding the said ledges far enough beyond the saddle to serve as supports for a stereotype plate; automatic means for withdrawing them after the said plate has been deposited in the said trough; and automatic means for protruding them while the said plate is in the trough; said automatic means comprising springs drawing said ledges centerward, cams mounted to have planetary movement relative to the axis of rotation of said saddle, radial fingers on said cams and stationary studs situated so as to engage with said fingers.

3. In apparatus for machining curved stereotype plates, the combination of rotary cutters positioned to machine their straight side edges; arms in which said cutters are mounted and rotated; a pivot upon which said arms can be rocked; and means for rocking them to vertically vary the level to which the said edges are to be machined.

4. In apparatus for machining curved stereotype plates, the combination with means for traversing the latter in the direction of their length, of rotary cutters positioned to machine their straight side edges; pivoted arms in which said cutters are mounted and rotated; and means for rocking them to vertically vary the level to which the said edges are to be machined.

5. In apparatus for machining curved stereotype plates, the combination of rotary cutters positioned to machine their straight side edges; pivoted arms in which said cutters are mounted and rotated; and means for rocking them to vertically vary the level to which the said edges are to be machined, comprising a screw-threaded rod working in a screw-threaded nut stationary with respect to the said arm and engaging loosely with the latter.

6. In apparatus for machining curved stereotype plates, the combination with means for traversing the latter in the direction of their length, of rotary cutters positioned to machine their straight side edges; pivoted arms in which said cutters are mounted and rotated; and means for rocking them to vertically vary the level to which the said edges are to be machined, comprising a screw-threaded rod working in a screw-threaded nut stationary with reference to the said arm and engaging loosely with the latter.

7. The combination with the saddle and machining cutters of an apparatus of the described type, of a traverser which alternately passes a stereotype plate on its saddle and at the end of a cycle of the said saddle, pushes the said plate off the saddle over and past the cutters rotated to machine its straight side edges; a regularly rotating screw having a right hand and a left hand thread joined at their ends to reciprocate the traverser; a constantly turning gear to rotate the saddle through its cycle and to move the traverser into the plate-pushing position; a manually controlled pawl and ratchet to connect the saddle with the said gear; gearing between the saddle and the screw to rotate the latter during a cycle of the former; automatic means for disengaging the pawl from the ratchet at the end of a cycle of the saddle; gearing driven constantly by the said gear; a clutch on the last-mentioned gearing between the saddle and the screw and which is automatically connected with the first mentioned gearing when the pawl is disengaged from the ratchet; and automatic means for opening the said clutch at the end of a reciprocation by the traverser.

In testimony whereof I affix my signature in presence of two witnesses.

GEORG SEIDEL.

Witnesses:
 HENRY HASPER,
 WOLDEMAR HAUPT.